United States Patent [19]
Peled et al.

[11] Patent Number: 5,239,021
[45] Date of Patent: Aug. 24, 1993

[54] FLAME RETARDED POLYCARBONATES

[75] Inventors: Michael Peled; Meir Manor, both of Beer-Sheva, Israel

[73] Assignee: Bromine Compounds Limited, Beer-Sheva, Israel

[21] Appl. No.: 931,564

[22] Filed: Aug. 18, 1992

Related U.S. Application Data

[63] Continuation of Ser. No. 599,617, Oct. 18, 1990, abandoned.

[51] Int. Cl.$^5$ .......................... C08K 5/10; C08K 5/03; C08K 5/3415; C08L 69/00
[52] U.S. Cl. ..................... 525/468; 525/146; 525/148; 525/467; 524/104; 524/288; 524/468
[58] Field of Search .............. 525/146, 148, 467, 468; 524/104, 288, 468

[56] References Cited

U.S. PATENT DOCUMENTS

| | | | |
|---|---|---|---|
| 4,316,838 | 2/1982 | Tokuda | 524/469 |
| 4,626,573 | 12/1986 | Younes | 525/148 |
| 4,849,467 | 7/1989 | Shorr | 524/104 |

FOREIGN PATENT DOCUMENTS

| | | | |
|---|---|---|---|
| 1569070 | 6/1980 | European Pat. Off. | |
| 199334 | 10/1986 | European Pat. Off. | 524/288 |
| 218215 | 4/1987 | European Pat. Off. | |
| 344700 | 12/1989 | European Pat. Off. | 524/288 |

OTHER PUBLICATIONS

Derwent Abstract 88-138013.

*Primary Examiner*—David J. Buttner
*Attorney, Agent, or Firm*—Michael N. Meller

[57] ABSTRACT

Flame retarded plastic composition are described, comprising a polycarbonate and a flame-retardant additive selected from pentabromobenzyl-monoacrylate, tribromostyrene and tribromophenyl maleimide, and their mixtures. The flame-retardant polycarbonates so obtained retain excellent transparency.

5 Claims, No Drawings exceptions are detailed in Table III below:

FLAME RETARDED POLYCARBONATES

This application is a continuation of U.S. application Ser. No. 599,617, filed Oct. 18, 1990 now abandoned.

FIELD OF THE INVENTION

The present invention relates to flame retarded transparent plastic compositions. More particularly, the invention relates to polycarbonate compositions which incorporate flame-retardant additives, and which retain their transparency.

BACKGROUND OF THE INVENTION

Polycarbonates are used in the art for a variety of applications, for which flame retardancy is of importance, such as households (e.g., bath accessories), buildings (e.g., glass substitutes), and lighting covers and fixtures. However, one of the problems deriving from the incorporation of flame-retardant additives into polycarbonates is that these additives render the polycarbonates substantially non-transparent. Because many applications of polycarbonates require that the material be transparent, it is apparent that it is highly desirable to provide flame retarded polycarbonates which are substantially transparent, and the transparency of which is not substantially affected by the addition of flame-retardant agents.

SUMMARY OF THE INVENTION

It is an object of the present invention to provide such transparent flame-retarded polycarbonate compositions.

The flame retarded transparent plastic compositions of the invention comprise a polycarbonate and a flame-retardant additive selected from pentabromobenzyl-monoacrylate (PBB-MA), tribromostyrene (TBS) and tribromophenylmaleimide (TBPMI), each of the said additives being present alone or in combination of two or three of the said additives.

According to a preferred embodiment of the invention, the composition comprises:
at least 85 wt/% polycarbonates;
up to 10 wt/% PBB-MA;
up to 10 wt/% TBS;
up to 10 wt/% TBPMI; and
optionally, conventional plastic additives. Such conventional additives are known to the skilled person, and need not be detailed herein. Preferably, TBS is present in amounts of up to 5%, for optimal transparency.

The compositions of the invention are prepared by mixing a polycarbonate matrix with a flame-retardant additive comprising one or more of PBB-MA, TBS and TBPMI, and compounding the same at an elevated temperature. This elevated temperature is such that the polycarbonate melts, and at least part of the additive mixture polymerizes during compounding.

DETAILED DESCRIPTION OF THE INVENTION

The above and other characteristics and advantages of the invention will be further understood through the following description of illustrative and non-limitative examples.

EXAMPLE 1

Transparency of Compositions Containing PBB-MA

In order to test the suitability of compositions containing PBB-MA alone, polycarbonate Makrolon 2405 (which is a linear amorphous thermoplastic polycarbonate, manufactured by Bayer AG) was compounded with the following FR additives: Pyrocheck 68 (brominated polystyrene, Ferro, Inc.), Pentabromobenzylpolyacrylate (PBB-PA-FR 1025, Bromine Compounds Limited) and PBB-MA (Bromine Compounds Limited). The results are detailed in Table II below. From the results in the table it can be seen that, while other properties, such as UL-94 and HDT are very similar, PBB-MA is the only additive which provides a transparent product.

Transparency in all tests herein was tested by visual inspection of specimens of 1.6 mm and 3.2 mm thickness, and by the following Test Procedure.

Test Procedure

A UV-Visible Sprectrophotometer (Philips PU-8800) was used to test the transmittance of samples of different polycarbonates. Transmittance at different wavelengths was measured, as detailed in Table I below, in which two examples are shown: neat polycarbonate (Makrolon 2405), and the same polycarbonate containing 6 wt % of PBB-MA. The samples consisted of 0.8 mm thick strips, with a width suitable for the housing of the spectrophotometer. Reduction of 10–20% in transmittance was observed in transparent samples.

TABLE I

Transmittance of neat and FR polycarbonates

| Wave Length | Transmittance | |
|---|---|---|
| | PC Neat | PC + 6% PBB-MA |
| 500 | 88 | 81 |
| 600 | 88 | 85 |
| 700 | 89 | 87 |
| 800 | 89 | 88 |

Compositions Tested

Compounding was done in a plasti-corder at 250°-260° C., with subsequent press-molding at 250°-270° C. and a pressure of 20 Bar.

TABLE II

| | Formulation | | |
|---|---|---|---|
| Components % | 1 | 2 | 3 |
| PC Makrolon 2405 | 92.5 | 93.5 | 93.5 |
| Pyrocheck-68 (Ferro) | 7.0 | — | — |
| PBB-PA (BCL) | — | 6.0 | — |
| PBB-MA (BCL) | — | — | 6.0 |
| Mg-Stearate | 0.5 | 0.5 | 0.5 |
| Bromine | 4.8 | 4.2 | 4.2 |
| Transparency | NO | NO | YES |
| Color | Yellowish-white | | white |
| UL-94 Rating | V2 | V2 | V2 |
| 1.6 mm Max. Flaming Time | 1 | 2 | 1 |
| HDT, OC | 127 | 127 | 119 |
| Izod Notched Impact Energy, J/m | 100 | 51 | 54 |

EXAMPLE 2

Various compositions were prepared, containing PBB-MA, TBS and TBPMI in polycarbonate. The polycarbonate used was as in Example 1 Makrolon 2405 (Bayer AG). All formulations contained 1% stearic acid, all formulations contained 4.3% bromine, and the tests were as described above. All compositions obtained in this example were transparent, as defined above. Best transparency results were obtained with formulations 1-3 and 6-8. Results are shown in Table III below.

TABLE III

| P.C./Composition | 1 | 2 | 3 | 4 | 5 | 6 | 7 | 8 |
|---|---|---|---|---|---|---|---|---|
| Bayer, Makrolon 2405 | 93.0 | 91.5 | 92.6 | 92.9 | 92.75 | 92.85 | 92.9 | 91.65 |
| PBB-MA | 6.0 | — | 3.0 | 0.6 | — | 5.4 | 5.4 | — |
| TBS | — | — | 1.52 | 5.5 | 5.5 | — | 0.6 | 0.6 |
| TBPMI | — | 7.5 | 1.88 | — | 0.75 | 0.75 | — | 6.75 |
| UL-94 1.6 mm flaming Total Time (sec) | 11 | 27 | 22 | 28 | 19 | 17 | 32 | 14 |
| Rating | V-2 | V-2 | V-2 | V-2 | V-2 | V-2 | V-2 | V-2 |

From the above examples, it is apparent that it is possible to provide polycarbonates which are made flame-retardant according to the invention, by the incorporation of an additive chosen from mixtures of the flame-retardant additives, or containing one of them, and this, furthermore, is achieved while maintaining good flame-retardant properties of the final material, as can be seen from the data provided in the examples. Of course, as will be apparent to the skilled person, the examples provided herein are only provided in order to illustrate the invention, and it is possible to provide many different compositions containing different proportions of the flame-retardants, without exceeding the scope of the invention.

We claim:

1. A flame retarded transparent plastic composition comprising a polycarbonate and a flame-retardant additive selected from the group consisting of pentabromobenzyl-monoacrylate, tribromostyrene and a combination thereof.

2. A flame retarded transparent plastic composition comprising:
   at least 85 wt/% polycarbonate;
   from 0.6 to 10 wt/% pentabromobenzyl-monoacrylate; to 10 wt/% pentabromobenzyl-monoacrylate;
   from 0.6 to 10 wt/% tribromostyrene; and to 10 wt/% tribromostyrene; and
   optionally, conventional plastic additives.

3. A flame retarded transparent plastic composition comprising:
   at least 85 wt/% polycarbonate;
   from 0.6 to 10 wt/% pentabromobenzyl-monoacrylate; to 10 wt/% pentabromobenzyl-monoacrylate;
   from 0.6 to 5 wt/% tribromostyrene; and to 5 wt/% tribromostyrene; and optionally, conventional plastic additives.

4. A process for the preparation of a flame retarded transparent plastic composition, comprising mixing a polycarbonate matrix with a flame-retardant additive comprising a compound selected from the group consisting of pentabromobenzyl-monoacrylate, tribromostyrene and a combination thereof, and compounding the same at an elevated temperature.

5. A process according to claim 4, wherein at least part of the flame-retardant additive polymerizes during the compounding operation.

* * * * *